(12) United States Patent
Peng et al.

(10) Patent No.: US 8,189,337 B2
(45) Date of Patent: May 29, 2012

(54) MOUNTING APPARATUS FOR DATA STORAGE DEVICE

(75) Inventors: Wen-Tang Peng, Taipei Hsien (TW); Jun-Xiong Zhang, Shenzhen (CN); Zhi-Xin Li, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 277 days.

(21) Appl. No.: 12/615,240

(22) Filed: Nov. 9, 2009

(65) Prior Publication Data

US 2011/0043992 A1 Feb. 24, 2011

(30) Foreign Application Priority Data

Aug. 21, 2009 (CN) .......................... 2009 1 0305870

(51) Int. Cl.
*H05K 7/20* (2006.01)
(52) U.S. Cl. .............. 361/727; 361/679.31; 361/679.33; 361/741; 312/223.1; 312/333; 248/638
(58) Field of Classification Search ................... 361/727
See application file for complete search history.

(56) References Cited

U.S. PATENT DOCUMENTS

| | | | | | |
|---|---|---|---|---|---|
| 5,738,226 | A | * | 4/1998 | Dean | 211/41.17 |
| 6,038,126 | A | * | 3/2000 | Weng | 361/679.01 |
| 6,633,481 | B2 | * | 10/2003 | Pavol | 361/679.36 |
| 6,972,961 | B2 | * | 12/2005 | Erskine | 361/727 |
| 7,145,776 | B2 | * | 12/2006 | King et al. | 361/725 |
| 7,277,296 | B2 | * | 10/2007 | Ice | 361/756 |
| 7,298,624 | B2 | * | 11/2007 | Boswell et al. | 361/727 |
| 7,701,704 | B2 | * | 4/2010 | Huang et al. | 361/679.36 |
| 2005/0135069 | A1 | * | 6/2005 | King et al. | 361/727 |

* cited by examiner

*Primary Examiner* — Anthony Q Edwards
(74) *Attorney, Agent, or Firm* — Altis Law Group, Inc.

(57) ABSTRACT

A mounting apparatus is provided to hold a number of data storage devices each including opposite sidewalls. The mounting apparatus includes a bracket, a number of fasteners, and a number of fixing members. The fasteners are fixed to the sidewalls of each data storage device, respectively, and each fastener includes a head portion abutting the corresponding sidewall. Each fixing member includes a main body fixed to the bracket, a number of cushioning boards fixed to the main body, and a number of guiding rails fixed each fixed to a corresponding one of the plurality of cushioning boards. Each guiding rail defines a sliding groove. When the data storage devices are moved along two adjacent fixing members, the head portions are slid in the corresponding sliding grooves.

8 Claims, 5 Drawing Sheets

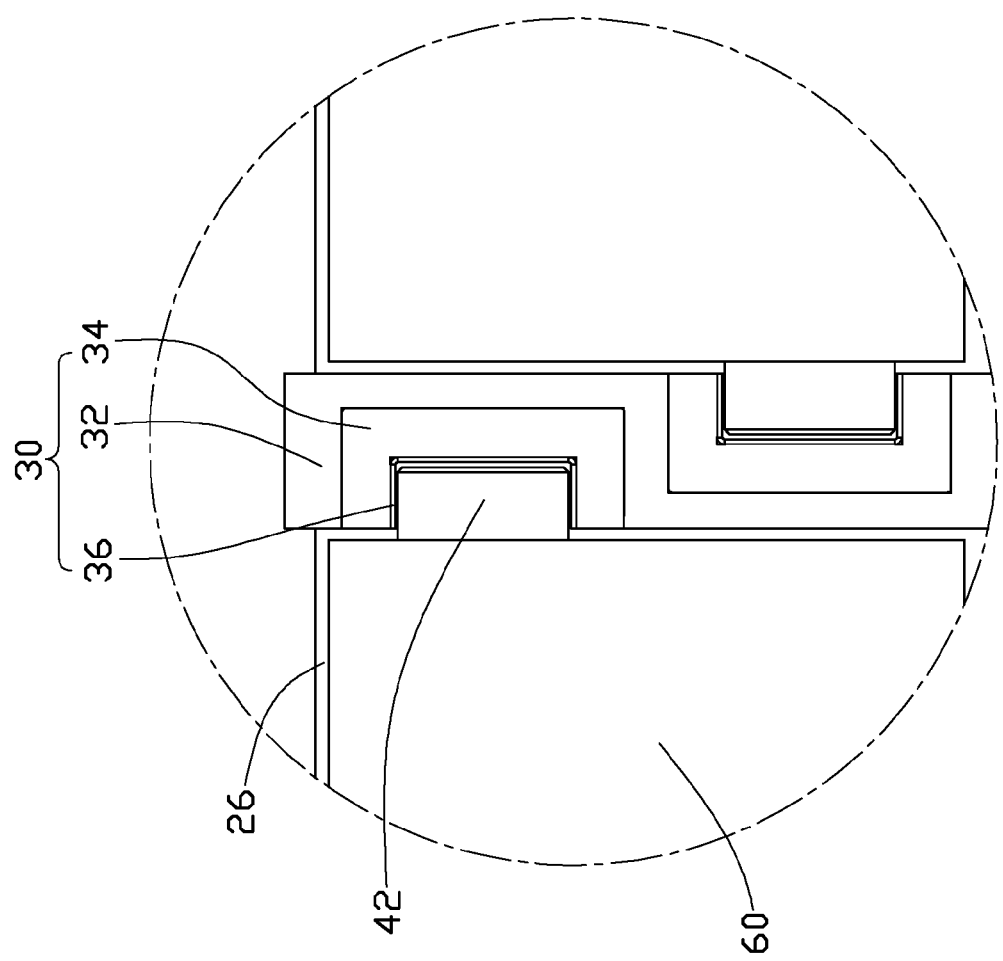

MOUNTING APPARATUS FOR DATA STORAGE DEVICE

BACKGROUND

1. Technical Field

The disclosure relates to mounting apparatuses for data storage devices, and particularly to a mounting apparatus for absorbing vibration of data storage devices mounted to the mounting apparatus.

2. Description of Related Art

Generally speaking, a bracket is mounted in a computer enclosure, to which a plurality of data storage devices will be attached. During use of the computer, the storage devices vibrate and make noise when accessed. Moreover, the vibrations may cause the storage devices to move against the bracket, which will harm the data storage devices.

BRIEF DESCRIPTION OF THE DRAWINGS

FIG. 5 is an enlarged view of the circled portion V of FIG. 4.

DETAILED DESCRIPTION

Figure 1:
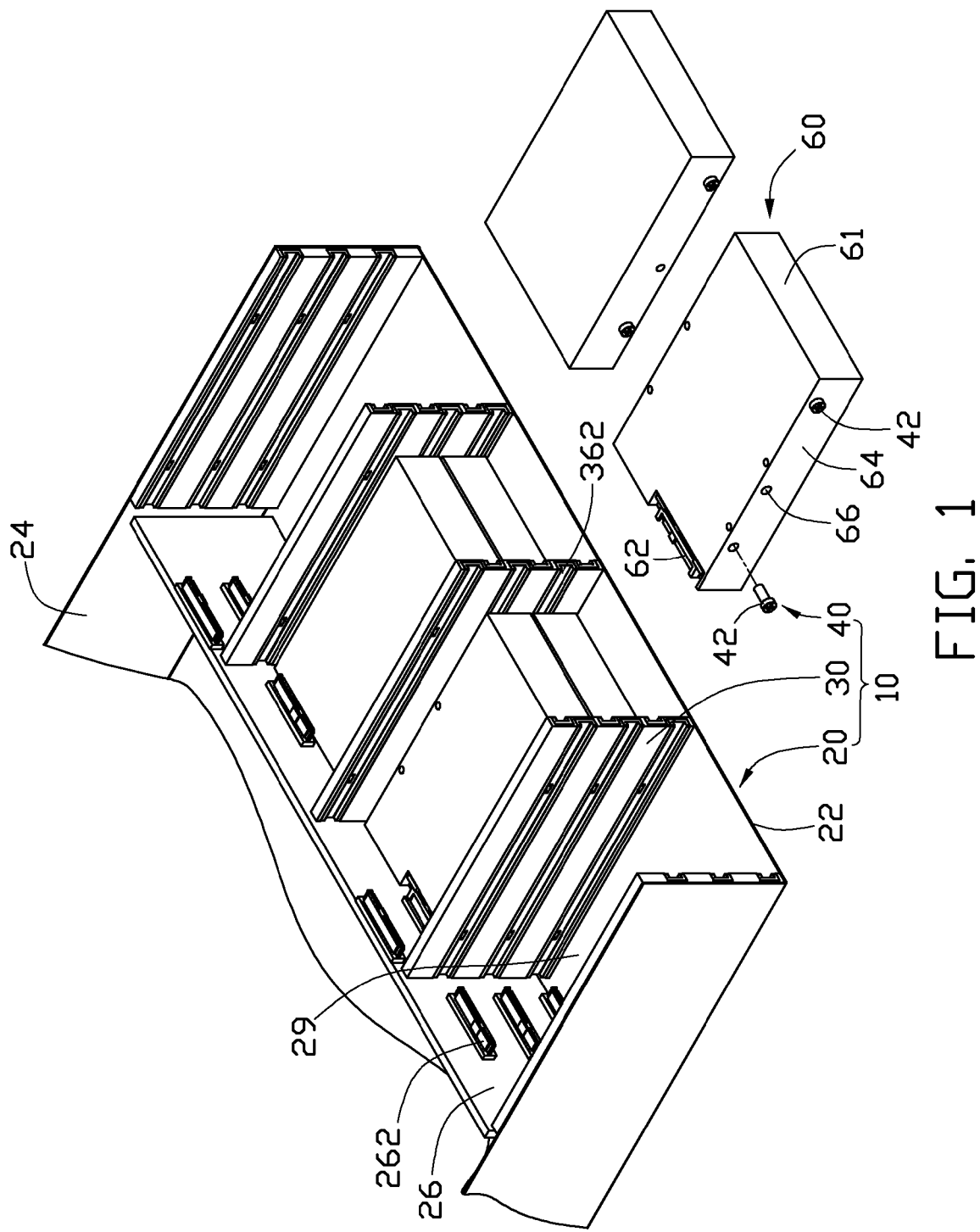
FIG. 1 is an exploded, isometric view of an exemplary embodiment of a mounting apparatus with a plurality of data storage devices, the mounting apparatus including a plurality of fixing members.

Referring to FIG. 1, an exemplary embodiment of a mounting apparatus 10 is provided to fix a plurality of data storage devices 60. The mounting apparatus 10 includes a bracket 20, a plurality of fixing members 30, and a plurality of fasteners 40.

Each data storage device 60 includes two opposite sidewalls 64 each defining a plurality of fixing holes 66, a front side 61, and a rear side (not labeled) connected to front and rear ends of the two sidewalls 64. The rear side includes an interface 62.

Each fastener 40 includes a coin-shaped head portion 42, and a screw portion (not labeled) extending from the head portion 42. The screw portions of the fasteners 40 are fixedly screwed in the fixing holes 66 of the corresponding data storage devices 60, and the head portions 42 are abutted to the sidewalls 64 of the corresponding data storage devices 60, respectively.

Figure 2:
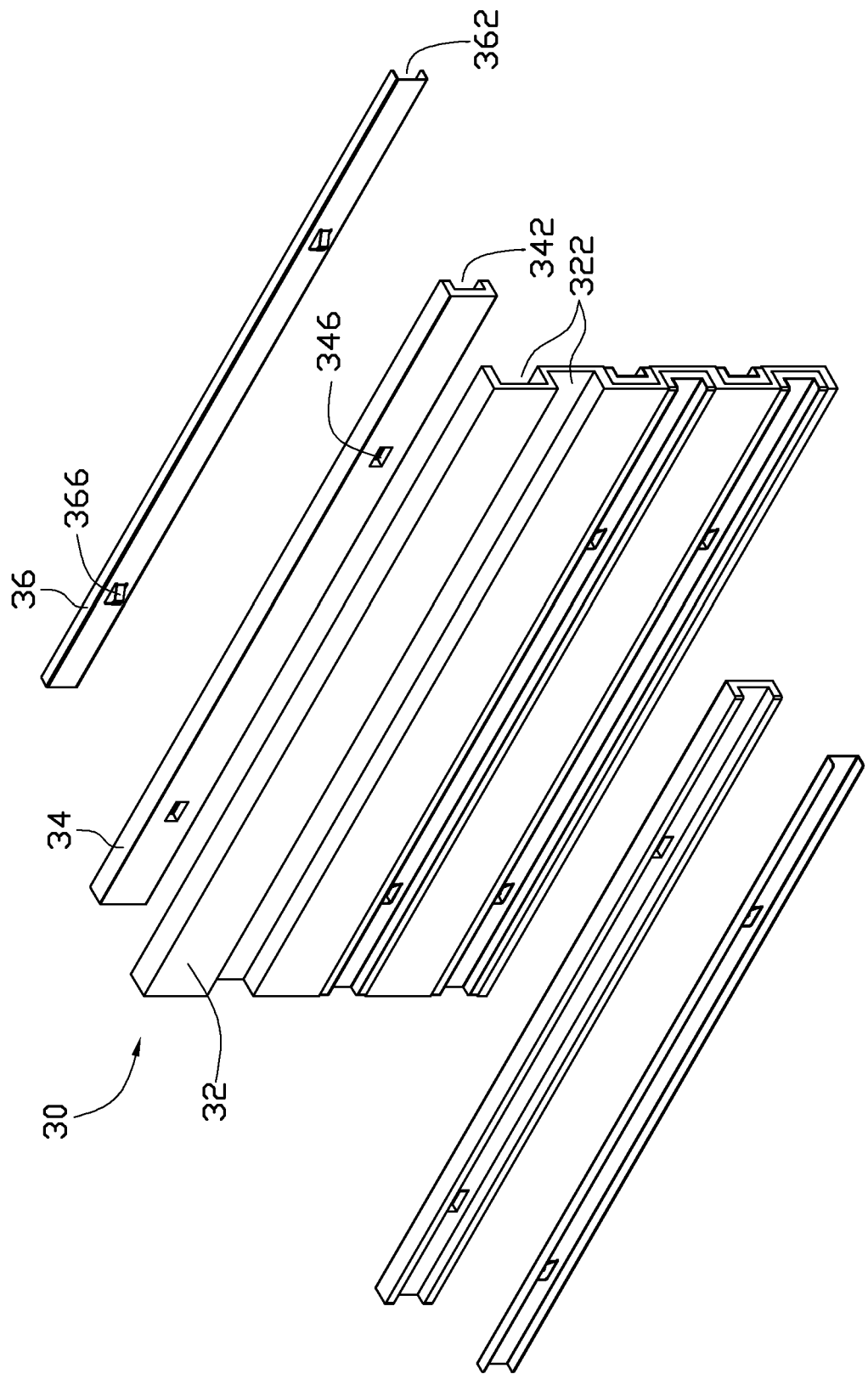
FIG. 2 is a partially exploded, isometric view of one of the fixing members of FIG. 1.

Referring to FIG. 2, each fixing member 30 includes a main body 32 having a generally multiple connected "S" shaped cross-section, a plurality of cushioning boards 34, and a plurality of guiding rails 36. The main body 32 includes opposite sides, each side defines a plurality of parallel fixing grooves 322. The cushioning boards 34 are made of rubber, plastic, or other vibration-absorptive material. Each cushioning board 34 has a U-shaped cross-section, and a receiving groove 342 is defined in each cushioning board 34. A plurality of clamping holes 346 are defined in each cushioning board 34, communicating with the receiving groove 342. Each guiding rail 36 defines a sliding groove 362, and width of the sliding groove 362 is a little greater than a diameter of the head portion 42 of each fastener 40. A plurality of resilient latching portions 366 extend from each guiding rail 36, opposite to the sliding groove 362. The latching portions 366 are wedge-shaped, corresponding to the clamping holes 346 of the corresponding cushioning board 34.

In assembly of each fixing member 30, each cushioning board 34 is compressed, and inserted into one of the plurality of fixing grooves 322 of the main body 32. Therefore, the cushioning board 34 is deformed, and elasticity of the cushioning board 34 forces the cushioning board 34 to be clamped in the corresponding fixing groove 322. In another embodiment, each cushioning board 34 can be fixed to the corresponding fixing groove 322 via fasteners such as bolts (not shown). Each guiding rail 36 is slid into the corresponding receiving groove 342 of the corresponding cushioning board 34, with the latching portions 366 of the guiding rail 36 engaging in the corresponding clamping holes 346 of the cushioning board 34.

The bracket 20 includes a bottom plate 22, and two opposite side plates 24 perpendicularly extending up from opposite sides of the bottom plate 22. A circuit board 26 perpendicularly extends up from a rear portion of the bottom plate 22, and is connected to the side plates 24. The plurality of fixing members 30 are perpendicularly fixed to the bottom plate 22 parallel to the side plates 24, with the sliding grooves 362 of the guiding rails 36 of the fixing members 30 parallel to the bottom plate 22. A rear end of each fixing member 30 is connected to the circuit board 26, therefore, a receiving space 29 is formed between two adjacent fixing members 30. The opposite outmost fixing members 30 abut the side plates 24, respectively. In this embodiment, the outmost fixing members 30 each have a plane side abutting the side plates 24. The sliding grooves 362 of the adjacent fixing members 30 are correspondingly aligned coplanarly. A plurality of connectors 262 extend from the circuit board 26 into each receiving space 29.

Figure 3:
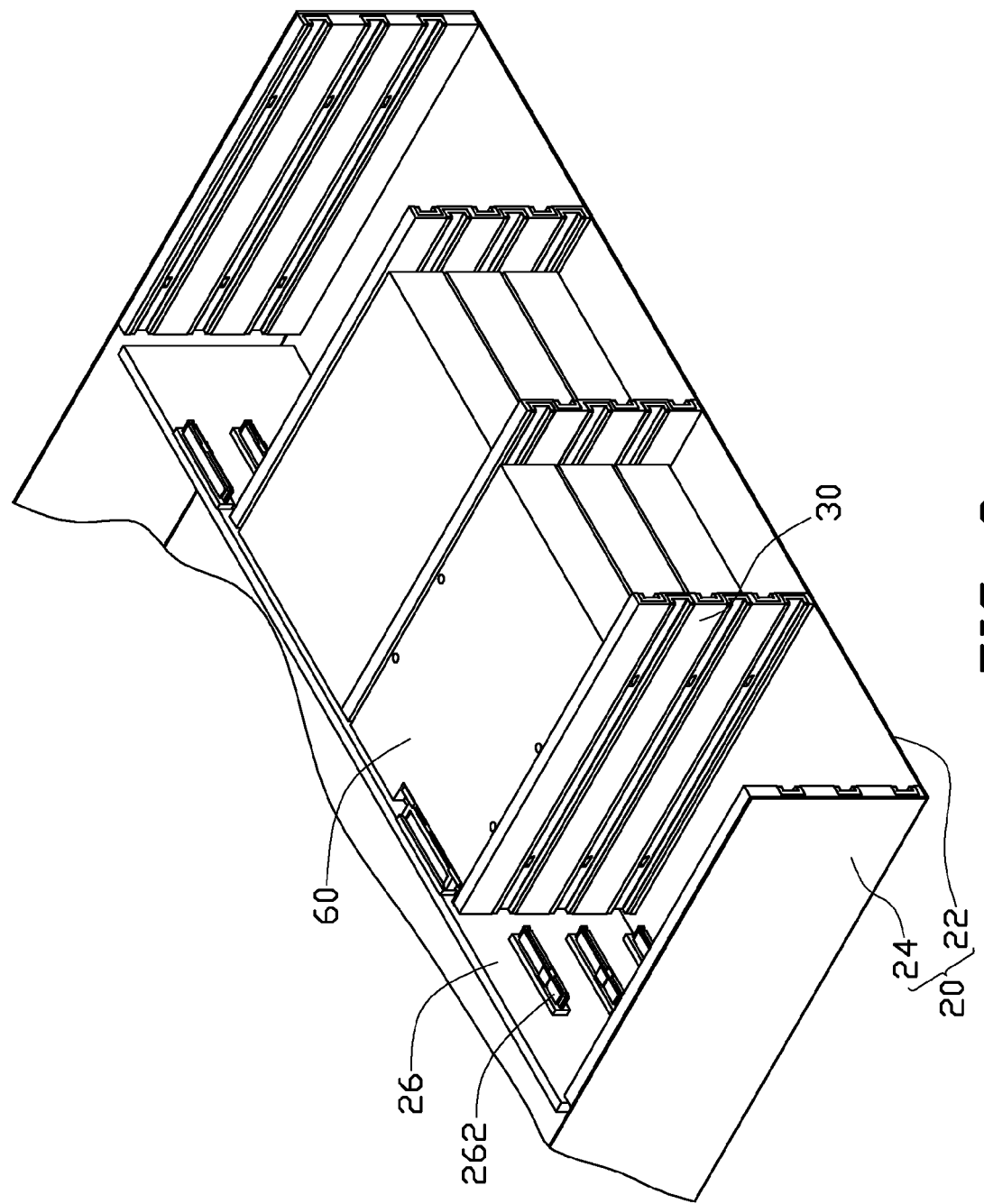
FIG. 3 is an assembled, isometric view of the mounting apparatus and the data storage devices of FIG. 1.
Figure 4:
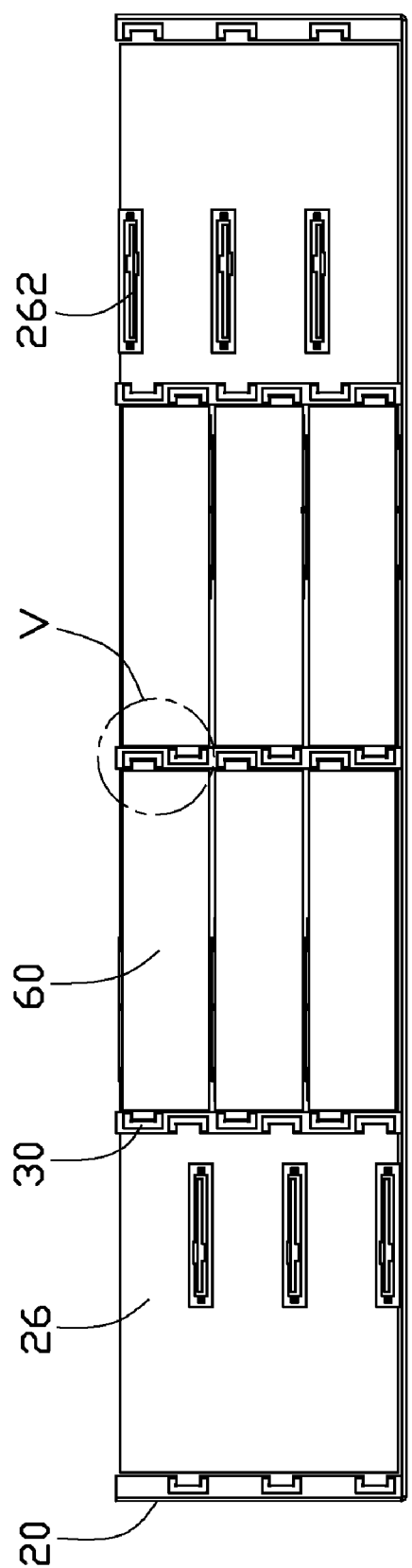
FIG. 4 is a front plan view of FIG. 3.

Referring to FIGS. 3 to 5, to assemble the plurality of data storage devices 60 to the mounting apparatus 10, each data storage device 60 is pushed into one of the receiving spaces 29 of the bracket 20, with the head portions 42 of the fasteners 40 sliding in two corresponding sliding grooves 362 of the adjacent fixing members 30. When the interface 62 of the data storage device 60 is engaged in the corresponding connector 262 of the circuit board 26, the data storage device 60 is completely assembled in the bracket 20, and electrically connected to the circuit board 26. Thereafter, a top plate and a front plate (not shown) are fixed to a top of the bracket 20 and a front of the bracket 20, respectively, to prevent the plurality of data storage devices 60 from disengaging from the bracket 20.

To detach the plurality of data storage devices 60, the top and front plates are removed from the bracket 20, and then the plurality of data storage devices 60 are drawn out from the receiving space 29 of the bracket 20.

It is believed that the present embodiments and their advantages will be understood from the foregoing description, and they will be apparent that various changes may be made thereto without departing from the spirit and scope of the description or sacrificing all of their material advantages, the examples hereinbefore described merely being exemplary embodiment.

What is claimed is:

1. A mounting apparatus for a plurality of data storage devices each including opposite sidewalls, the mounting apparatus comprising:
   a bracket;
   a plurality of fasteners fixed to the sidewalls of each data storage device, each fastener comprising a head portion abutting the corresponding sidewalls; and a plurality of fixing members each comprising a main body fixed to the bracket, a plurality of cushioning boards fixed to the main body, and a plurality of guiding rails each fixed to a corresponding one of the plurality of cushioning boards; each guiding rail defining a sliding groove, wherein the main body comprises two opposite sides, each side defines a plurality of parallel fixing grooves, the cushioning boards are resiliently received in the fixing grooves, respectively, each cushioning board is generally U-shaped, and a receiving groove is defined in the cushioning board, for fixing the corresponding guiding rail;

wherein each of the plurality of data storage devices is held between two adjacent fixing members, when the data storage device is moved along the fixing members, the head portions are slid in the corresponding sliding grooves.

2. The mounting apparatus of claim 1, wherein each cushioning board is made of rubber, plastic, or other vibration-absorptive material.

3. The mounting apparatus of claim 1, wherein each guiding rail faces a corresponding guiding rail mounted on an adjacent fixing member, and the sliding grooves of the two guiding rails are aligned coplanarly, and a width of each sliding groove is little greater than a diameter of each head portion.

4. The mounting apparatus of claim 1, wherein the main body has a generally multiple connected "S" shaped cross-section.

5. The mounting apparatus of claim 1, wherein each cushioning board defines a plurality of clamping holes communicating with the corresponding receiving groove, a plurality of latching portions extend from each guiding rail, to engage in the clamping holes, respectively.

6. The mounting apparatus of claim 5, wherein the latching portions are wedge-shaped, and opposite to the sliding groove.

7. The mounting apparatus of claim 1, wherein the bracket comprises a bottom plate for perpendicularly fixing the main body, two side plates extending from opposite sides of the bottom plate.

8. The mounting apparatus of claim 7, further comprising a circuit board to be electrically connected to the plurality of data storage devices, wherein the circuit board perpendicularly extends from the bottom plate, and connected to the side plates.

* * * * *